United States Patent [19]

Desmoulins nee Fouchereau et al.

[11] 4,067,606
[45] Jan. 10, 1978

[54] TROLLEY TABLE AND SEAT

[76] Inventors: Pierrette Desmoulins nee Fouchereau; Guy Desmoulins, both of 83 Boulevard du Redon - Super Rouviere, Batiment 9 - 13009 - Marseille, France

[21] Appl. No.: 732,414

[22] Filed: Oct. 14, 1976

[30] Foreign Application Priority Data

Oct. 21, 1975 France .................... 75.32977
Mar. 19, 1976 France .................... 76.08609

[51] Int. Cl.² .......................................... A47B 39/00
[52] U.S. Cl. ................................. 297/141; 108/91; 108/135; 297/170; 297/239
[58] Field of Search ............ 108/6, 9, 10, 91, 159; 297/134, 135, 141, 142, 170, 172–174, 239; 280/33.99 R, 33.99 H, 47.34, 47.37, 47.38, 47.4

[56] References Cited

U.S. PATENT DOCUMENTS

| D. 167,119 | 6/1952 | Shott | 297/141 X |
| 2,700,582 | 1/1955 | Munsch | 297/142 X |
| 2,762,669 | 9/1956 | Watson | 108/91 |
| 3,106,295 | 10/1963 | Berlin | 108/159 X |
| 3,495,850 | 2/1970 | Ziskal | 280/47.34 |

Primary Examiner—James C. Mitchell
Attorney, Agent, or Firm—Lewis H. Eslinger

[57] ABSTRACT

A trolley table has a chassis mounted on casters and adapted to support generally horizontally a table-top or tray which may be detachable, and a seat articulated to the chassis to pivot between folded and unfolded positions, the trolley table being so constructed and arranged that with the seat folded it can be nested together with other trolley tables.

16 Claims, 9 Drawing Figures

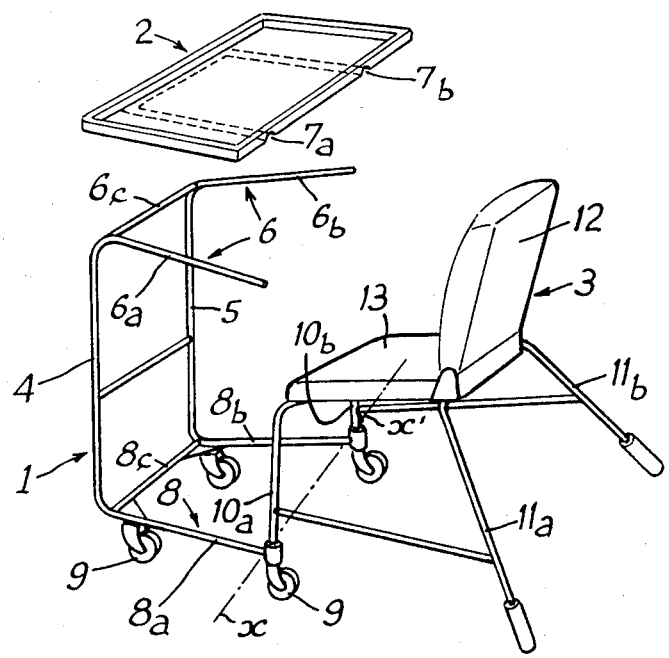
FIG.1
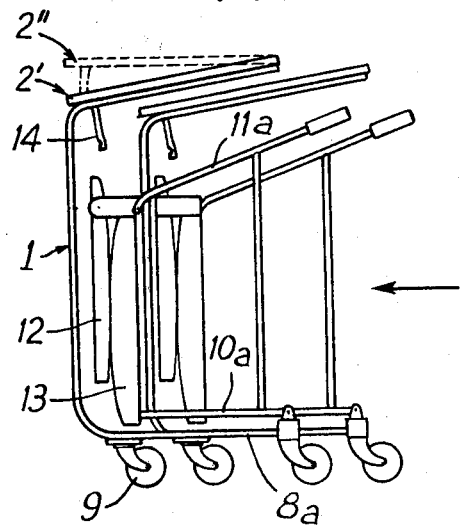
FIG.2
FIG.3

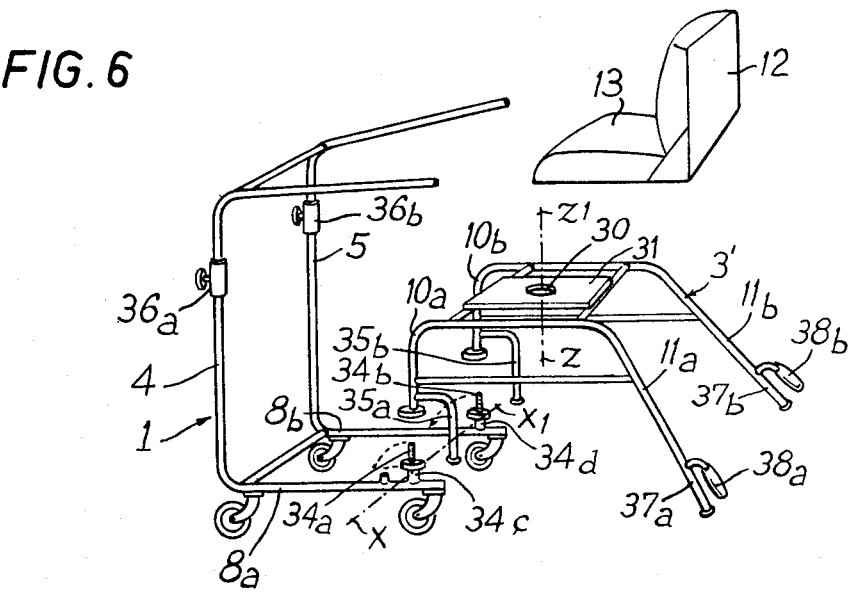
FIG. 6
FIG. 7
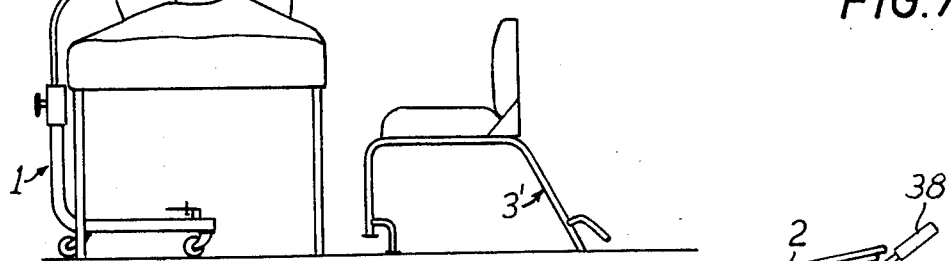
FIG. 8
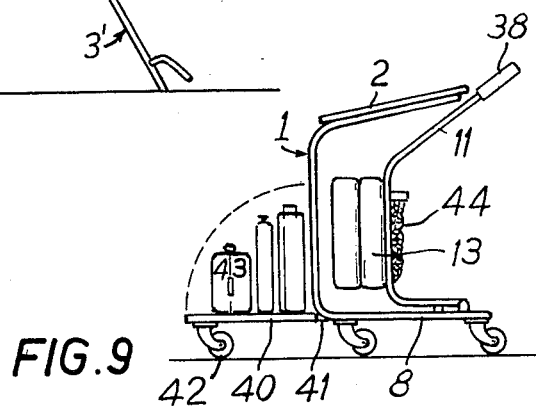
FIG. 9

TROLLEY TABLE AND SEAT

This invention relates to a trolley table having a folding seat and arranged to nest with other identical trolley tables.

A known trolley table comprises a caster-mounted chassis with an upper part in the form of a tray or table top support and disposed in a substantially horizontal plane, a tray or table top, and a seat equipped with a back or squab which can be folded down onto the seat. The known trolleys have the disadvantage that when not in use they take up a large amount of space that could be utilised for other purposes.

Nesting food trolleys are known and are widely used in markets. When such trolleys are not in use they are nested together which greatly reduces the space they occupy.

There are many rooms, e.g. canteens, assembly halls, reading rooms, and classrooms etc., which are intended for group use and occupied by tables and chairs. These rooms could frequently be used for other purposes, e.g. as gymnasiums or theatres, if it were possible to store the furniture quickly in a corner of the room.

In accordance with the present invention there is provided a trolley table comprising a chassis mounted on casters and including an upper part forming a horizontal or slightly inclined support for a surface element, a surface element having a substantially continuous and flat upper surface, and a seat connected to the chassis for pivotal movement relative thereto about a transverse horizontal axis between an unfolded position and a folded position beneath the surface element support, and the trolley being so constructed and arranged that it can be nested together with other identical trolleys when the seat is in the said folded position.

The surface element can be either a tray or a table top.

In self-service restaurants a tray is used to carry selected items from a serving counter to a table.

Table trolleys of the present invention may have detachable restaurant trays so that a customer in a self-service restaurant can take a trolley tray to collect the required items of food from the serving counter and then a trolley from a line of nesting trolleys to sit at any point of the room.

Existing restaurant trays must be held in both hands when carrying food and this can be inconvenient, for example if a person's hands are full with other items. A trolley table in accordance with the invention can be moved with just one hand, and may be provided with a compartment for carrying parcels or personal articles.

The trolley tables according to the invention may obviate the need for furniture in self-service restaurants or canteens, so that such rooms can be used for other purposes between serving meals, e.g. assembly halls, workrooms or theatres.

The cost of operating self-service restaurants may be reduced by the reduction in the cost of equipment and greater ease of operation. There is no need to clean any tables and cleaning of the room after a meal is facilitated. The restaurant clients can, if they so require, eat on their own or place a number of tables in juxtaposition to form a common table.

Making the tray detachable facilitates clearing of used dishes.

Clean trays can conveniently be stacked and the trolleys nested in a line at the entrance of a room. On entry each customer takes a tray and a trolley, places the tray on the trolley, serves himself, and sits down to eat. After finishing the meal the trolley is taken away, the tray detached and taken to a washing-up section, and the trolley re-nested in the line of trolleys.

The trolley tables according to the invention can also be used advantageously in hospitals to deliver patients' meals, as reading desks in common reading rooms, e.g. in libraries, as desks for students, in assembly halls, or in any other group-used room from which furniture must be removed to allow the room to be used for other purposes or to facilitate cleaning.

Trolley tables in accordance with the invention can be moved from a room very quickly, by folding the seats and nesting the trolleys together in a line.

The folding seat may have rear legs, without casters, which rest on the ground when the seat is unfolded to avoid accidental movement of the table when the seat is unfolded.

The trolley tables according to the invention can also be used to advantage as temporary furniture, e.g. as outside equipment for restaurants or cafes, e.g. in seasonal resorts, because they can be stored in a comparatively small space which facilitates storage out of season and transportation.

Another possible use of the trolley tables is as hire furniture for theatres or the like, or temporary meetings such as conferences, as transportation and the installation of the furniture is facilitated.

Some embodiments of the invention will now be described in detail by way of example with reference to the accompanying drawings, in which:

FIG. 1 is a perspective view of a first embodiment;

FIG. 2 shows two slightly modified trolley tables nested together;

FIG. 3 is a part plan view of two trolleys nested together;

FIG. 6 is a perspective view of a further trolley table embodying the invention;

FIG. 7 is a detail of the trolley table of FIG. 6;

FIG. 8 illustrates a possible use of the trolley table of FIG. 6; and

FIG. 9 is a side view of a trolley table according to the invention provided with a luggage platform.

Figure 4:
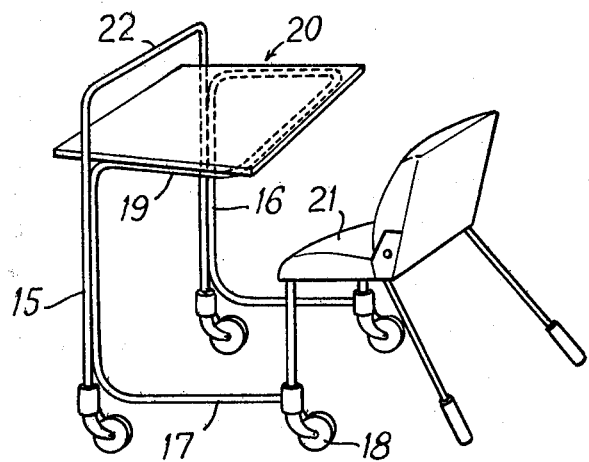
FIG. 4 is a perspective view of another trolley in accordance with the invention.

The table trolley shown in FIG. 1 is suitable for use in a restaurant and comprises a chassis 1, a detachable tray 2, shown in a raised position, and a seat 3 articulated to the chassis 1 for movement about a horizontal axis $x - x'$.

The detachable tray facilitates tray cleaning operations and also allows the trolley to be nested together with other identical trolleys when the tray has been removed.

The chassis 1 comprises two vertical legs 4 and 5, and a U-shaped tray support 6 situated in a horizontal plane and open towards the seat 3, the side arms 6a and 6b of the support diverging towards the open end to permit nesting and being interconnected by cross-arm 6c.

Tray 2 is detachably mounted on the support 6 and is provided with locating grooves 7a, 7b on the underside of the tray, which grooves receive the arms 6a, 6b and 6c of the support. Alternatively other locating means can be used between the tray and its support, for example the tray may be adapted to fit over raised studs on the support 6.

A horizontal base 8 of the chassis is also U-shaped and open towards the seat, the side arms 8a and 8b of the base diverging rearwardly towards the open end and being interconnected by a cross-arm 8c. The base is mounted on four casters 9.

The seat has its two front legs 10a and 10b articulated to the rear ends of the arms 8a and 8b of the chassis base so that the seat can pivot through about 90° to a position beneath the support 6 (FIG. 2). The front legs 10a and 10b are slightly divergent in the direction away from the seat 13 so that in the seat folded position, the legs 10a and 10b are parallel with and above the arms 8a and 8b respectively, of the base. The rear legs 11a and 11b also diverge with respect to each other away from the seat. The seat has a back 12 which folds down against the actual seat 13 as shown in FIGS. 2 and 3. The rear legs 11a and 11b are also divergent in the rearward direction from the seat towards the ground so that when the seat is folded under the support 6 they extend upwardly, as shown in FIG. 2, and act as a trolley handle.

FIGS. 2 and 3 are elevation and part plan views of two trolley tables folded and nested together.

The trolleys shown in FIG. 2 differ from that of FIG. 1 in so far as the tray 2 is replaced by a table top 2' which is not detachable from the chassis. In addition the support 6 no longer lies in a horizontal plane and instead lies in an inclined plane extending slightly upwardly towards the seat, to allow nesting. Table top 2' is articulated to the support 6 for angular movement about a horizontal axis so that the table top can be moved into a horizontal position 2", shown in broken lines in FIG. 2, for use or into an inclined position 2' resting on the support 6, shown in solid lines, to allow nesting. The bottom surface of the top has struts 14 which are engageable on the cross-arm 6c of the support to hold the top in the horizontal position.

As the support 6 is not horizontal, there is no need for the support to be open at the end seat facing or for the side arms of the support to diverge. Thus the support may be of rectangular shape.

The arrows in FIGS. 2 and 3 indicate the direction in which the trolleys are brought together to nest with each other. When the trolleys are in their folded conditions, the rear legs 11a and 11b serve as handles as will be clear from FIGS. 2 and 3.

The trays or table tops have been omitted in FIG. 3 for reasons of clarity.

Figure 5:
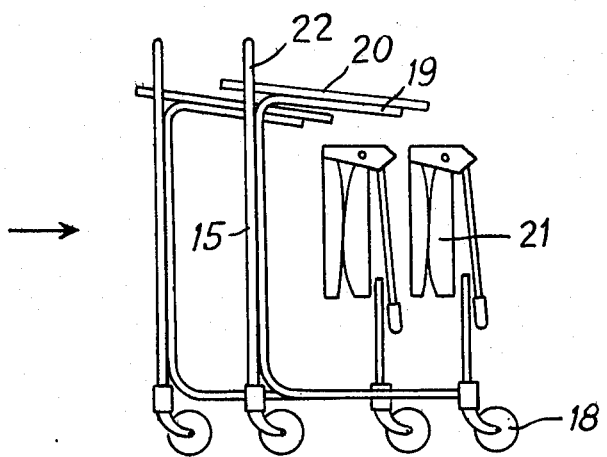
FIG. 5 shows two trolleys each as shown in FIG. 4, nested together.

FIGS. 4 and 5 show a variation in which the trolleys nest in the opposite sense to the previous embodiments, that is the front trolley fits into the rear trolley rather than vice versa.

In this trolley table the chassis consists of two vertical legs 15 and 16 connected by a yoke 22, a horizontal base 17 mounted on four casters 18, and a support 19 carrying a table top 20.

The support 19 and top 20 lie in a slightly inclined plane extending downwardly towards the seat 21. As the top is usable in this slightly inclined position and the trolley can be nested with other identical trolleys, as shown in FIG. 5, it is not necessary for the top to be hinged to the support as in the trolley of FIG. 2. However, if required the table top may be articulated about a horizontal axis situated along the edge of the support nearest the seat.

Of course, as in the previous embodiments, a detachable tray could be mounted on the support in place of the table top 20, in which case the support 19 can be horizontal and open at the front end remote from the seat, the side arms of the support diverging in the direction towards the open end.

If a table top 20 is fixed to the support it will be of trapezoidal shape, with the shorter parallel side nearest the seat. This is to allow nesting of the top in the yoke 22 of another trolley.

Alternatively the yoke may be dispensed with if the table top is fixed, in which case the tray 20 may be of rectangular shape.

The seat 21 of the trolley shown in FIGS. 4 and 5 is fully foldable as shown in FIG. 5. FIG. 6 shows a trolley table generally similar to that illustrated in FIG. 1, but with a number of improvements.

The seat 3' has a frame including legs 10a, 10b, 11a, 11b interconnected by a plate 31, and seat 13 with a back 12 pivotable with respect to the frame about a vertical axis $z - z1$ passing through the centre of an aperture 30 formed in the plate 31.

FIG. 7 shows in detail a pivot 32 which is fixed beneath the seat 13 and bears on the plate 31 through a ball bearing 33. Instead of a ball bearing a ring of an anti-friction material, e.g. a polyamide ring, can be used.

The two front legs of the seat are in the form of vertical tubes 10a and 10b and are shorter than the back legs. The front legs 10a, 10b receive vertical rods 34a, 34b mounted on hinges 34c, 34d having a common pivot axis $x - x1$ and carried by the rear ends of the side arms 8a, 8b of the base of chassis 1. The front legs 10a, 10b also have L-shaped extensions 35a, 35b respectively, which project beyond the bottom ends of the legs 10a, 10b to bear on the ground when the seat is separated from the table chassis.

The two vertical legs 4 and 5 of the table chassis are telescopic and are provided with devices 36a, 36b for locking the legs so that the level of the table top can be selectively adjusted.

FIG. 8 shows the trolley table being used by a person confined to bed.

When the seat is folded the trolley may be used to carry a tray with a meal to a room. Seat 3' can then be unfolded and separated from the table, and can, for example, be used by a nurse.

The table top or tray level is adjusted as permitted by the telescopic legs and locked in position by means of the devices 36a, 36b. The base of the chassis is moved transversely beneath the bed so that the table top or tray is readily accessible to the person on the bed. Subsequently the trolley with its seat remounted and folded can be re-used to clear away empty dishes or the like.

The seat of the trolley shown in FIG. 6 has mounted on lower end portions 37a, 37b of its two back legs 11a, 11b handles 38a, 38b which do not touch the ground when the seat is unfolded, as shown in FIG. 6, and which can be used for pushing the trolley when the seat is folded beneath the chassis support.

Of course the handles 38a, 38b can take shapes other than those shown in the drawing.

FIG. 9 illustrates a trolley with the seat 13 in the folded position beneath the table top 2 and having handles 38 formed by the ends of the rear legs 11 of the seat.

A platform 40 is articulated to the front of the chassis for pivotal movement about a horizontal transverse axis 41 from a position level with the base 8 of the chassis 1 to a folded position in which the platform lies against the vertical legs of the chassis 1. The platform movement is indicated by broken lines.

The platform has casters 42 at its front end and can be used, for example, for transporting luggage 43. When it is in its folded position the platform does not obstruct nesting of the trolley with other identical trolleys. In addition when platform 40 is in the folded position it acts as a screen when the table is being used.

As shown in FIG. 9 a bag or net 44 is secured underneath the seat 13 and can be used to hold small articles.

What is claimed is:

1. A trolley table comprising, a chassis having front and rear ends and a longitudinal axis extending from said front end to said rear end, said chassis including
   i. a pair of generally horizontal laterally extending side arms defining a base and diverging away from each other towards said rear end of the chassis and having free ends spaced from each other and defining an opening therebetween;
   ii. a pair of generally vertically extending legs on said horizontal base at the front end of the chassis; and
   iii. an upper support frame extending rearwardly from said legs;
   a plurality of casters secured to said base for supporting said chassis; a surface element mounted on said support frame and having a substantially flat upper surface; and a seat including a pair of laterally spaced front legs and a pair of rear legs; said front legs of said seat being respectively pivotally mounted on the free rear ends of said side arms along a common horizontal axis extending transversely of said longitudinal axis whereby said seat is adapted to be pivoted to a folded position about said horizontal axis wherein the seat is located beneath said support frame and an identical trolley can be axially nested in said opening between said side arms inside the legs of the folded seat.

2. A trolley table as defined in claim 1 wherein said horizontal base is formed as a generally U-shaped frame element having said side arms and a front cross arm extending therebetween, said U-shaped frame element opening towards said rear end of the chassis.

3. A trolley table as defined in claim 1 wherein said support frame is inclined slightly from the horizontal and extends upwardly towards the rear of said chassis; said support element being articulated on said support frame about a horizontal axis transverse to said longitudinal axis; and means for supporting said surface element on said support frame in a horizontal position.

4. A trolley table as defined in claim 1 wherein said rear legs of said seat are inclined rearwardly away from said seat and have free ends, whereby when the seat is in said folded position said rear legs extend upwardly from said seat and the free ends thereof are exposed for use as trolley handles to aid in displacing the table and axially nesting the front end thereof inside the rear end of another trolley table.

5. A trolley table as defined in claim 1 wherein said pair of front legs and said pair of rear legs of said seat diverge away from each other whereby when said seat is in said folded position said front legs and said rear legs diverge from each other towards the rear end of the trolley table.

6. A trolley table according to claim 1, in which said surface element is a detachable tray removably mounted on said support means, said support frame lying in a horizontal plane and comprising a U-shaped frame having opposed side arms with free ends, said side arms diverging slightly with respect to each other towards said free ends.

7. A trolley table according to claim 1 wherein said front legs are shorter than said rear legs and have hollow lower end portions, projections being pivoted on said free ends of said side arms of said base frame for movement about a horizontal axis transverse to said longitudinal axis; said hollow leg portions being detachably engageable with said projections, and each of said front legs including an extension projecting beyond said hollow end portion thereof for bearing against the ground when said front legs are disengaged from said chassis.

8. A trolley table according to claim 1 in which each of said rear legs has a lower free end and a handle attached to said leg near said free end for use when said seat is folded.

9. A trolley table according to claim 1, wherein a platform is pivoted to said chassis at said front end thereof for angular movement about a horizontal axis transverse to said longitudinal axis between a vertical position and a horizontal position.

10. A trolley table comprising, a chassis having front and rear ends and a longitudinal axis extending from said front end to said rear end, said chassis including
   i. a pair of generally horizontal laterally extending side arms defining a base and diverging away from each other towards said rear end of the chassis and having free rear ends spaced from each other and defining an opening therebetween;
   ii. a pair of generally vertically extending legs on said horizontal base at the front end of the chassis; and
   iii. an upper support frame extending rearwardly from said legs;
   a plurality of casters secured to said base for supporting said chassis; a surface element mounted on said support frame and having a substantially flat upper surface; and a seat including a pair of laterally spaced front legs and a pair of rear legs; said front legs of said seat being shorter than said rear legs and having hollow generally vertically extending free end portions; and projections pivotally mounted on said free rear ends of said side arms of said base for pivotal movement about a horizontal axis generally transverse to said longitudinal axis; said hollow free end portions of said front legs of the seat rearwardly receiving said projections whereby the seat can be pivoted with said projections to a folded position wherein the seat is located beneath said upper support frame and an identical trolley can be axially nexted in said opening between said side arms inside the legs of the folded seat.

11. A trolley table as defined in claim 10 wherein said horizontal base is formed as a generally U-shaped frame element having said side arms and a front cross arm extending therebetween, said U-shaped frame element opening towards said rear end of the chassis.

12. A trolley table as defined in claim 11 wherein said front legs of the seat each include an extension projecting beyond said hollow vertical end portion thereof for bearing on the ground when said front legs are disengaged from said vertical projections.

13. A trolley table as defined in claim 4 wherein each of said rear legs of said seat has a lower free end bearing on the ground and a handle attached near said lower free end for use when the seat is in said folded position.

14. A trolley table as defined in claim 1 wherein said support frame is a generally U-shaped frame element opening towards the rear of the trolley table and having a pair of rearwardly diverging arms and a cross arm at the front of the trolley table; said support surface element comprising a detachable tray removably mounted on said support frame.

15. A trolley table comprising a chassis having front and rear ends and a longitudinal axis extending from said front end to said rear end, castors mounting said chassis, said chassis having an upper part, a surface element having a substantially continuous and flat upper surface, support means for said surface element being provided by said upper chassis part, and said support means lying in a plane which is horizontal or slightly inclined to the horizontal, and a seat articulated to said chassis for pivotal movement relative thereto about a horizontal axis transverse to said chassis longitudinal axis, said seat being pivotable between an unfolded position and a folded position, in which said folded position said seat is beneath said support means, and said chassis having portions so arranged and inclined to said longitudinal axis and/or the horizontal plane that the trolley table can be nested together with other identical trolley tables when said seat is in said folded position, said chassis comprising a horizontal base and two vertical legs, said legs bearing said support means and being positioned at said front end of the chassis in a common plane normal to said longitudinal axis; said base comprising a U-shaped frame having opposite side arms with free ends, said side arms diverging slightly away from each other towards said free end; and said seat comprising two front legs and two back legs, said two front legs being articulated to said chassis to allow said pivoting movement of said seat with said transverse horizontal axis passing substantially through said free end of said side arms of said base, and said seat moving through substantially 90° from said unfolded position to said folded position, said front legs being vertical when said seat is unfolded and lying against said base when said seat is folded; said front legs being shorter than said back legs and having hollow lower end portions; and projections being pivoted to said free ends of said side arms of said base frame for movement about a horizontal axis transverse to said longitudinal axis, said hollow leg portion being detachably engageable with said projections, and each front leg comprising an extension projecting beyond said hollow end portion thereof for bearing against the ground when said front legs are disengaged from said chassis.

16. A trolley table comprising a chassis having front and rear ends and a longitudinal axis extending from said front end to said rear end, castors mounting said chassis, said chassis having an upper part, a surface element having a substantially continuous and flat upper surface, support means for said surface element being provided by said upper chassis part, and said support means lying in a plane which is horizontal or slightly inclined to the horizontal, and a seat articulated to said chassis for pivotal movement relative thereto about a horizontal axis transverse to said chassis longitudinal axis, said seat being pivotable between an unfolded position and a folded position, in which said folded position said seat is beneath said support means, and said chassis having portions so arranged and inclined to said longitudinal axis and/or the horizontal plane that the trolley table can be nested together with other identical trolley tables when said seat is in said folded position, said chassis comprising a horizontal base and two vertical legs, said legs bearing said support means and being positioned at said front end of the chassis in a common plane normal to said longitudinal axis; said base comprising a U-shaped frame having opposite side arms with free ends, said side arms diverging slightly away from each other towards said free end; and said seat comprising two front legs and two back legs, said two front legs being articulated to said chassis to allow said pivoting movement of said seat with said transverse horizontal axis passing substantially through said free end of said side arms of said base, and said seat moving through substantially 90° from said unfolded position to said folded position, said front legs being vertical when said seat is unfolded and lying against said base when said seat is folded; said back legs being inclined downwardly and rearwardly with respect to said seat when the seat is unfolded, whereby said back legs extend upwardly and rearwardly to serve as a handle when the seat is folded, and each of said back legs having a lower free end and a handle attached to said leg near said free end for use when said seat is folded.

* * * * *